United States Patent
K T

(10) Patent No.: US 10,623,214 B1
(45) Date of Patent: Apr. 14, 2020

(54) SYSTEM AND METHOD FOR MULTI-LEVEL AMPLITUDE MODULATION AND DEMODULATION

(71) Applicant: HCL TECHNOLOGIES LIMITED, Uttar Pradesh (IN)

(72) Inventor: Gandhi Karuna K T, Chennai (IN)

(73) Assignee: HCL TECHNOLOGIES LIMITED (IN)

( * ) Notice: Subject to any disclaimer, the term of this patent is extended or adjusted under 35 U.S.C. 154(b) by 0 days.

(21) Appl. No.: 16/275,613

(22) Filed: Feb. 14, 2019

(30) Foreign Application Priority Data

Dec. 1, 2018 (IN) .............................. 201811045445

(51) Int. Cl.
| H04L 27/04 | (2006.01) |
| H04L 25/49 | (2006.01) |
| H04L 7/033 | (2006.01) |
| H04L 27/06 | (2006.01) |

(52) U.S. Cl.
CPC ........ *H04L 25/4917* (2013.01); *H04L 7/0334* (2013.01); *H04L 27/04* (2013.01); *H04L 27/06* (2013.01)

(58) Field of Classification Search
CPC ... H04L 25/4917; H04L 7/0334; H04L 27/04; H04L 27/06
See application file for complete search history.

(56) References Cited

U.S. PATENT DOCUMENTS

| 3,983,485 A | 9/1976 | Stuart |
| 5,280,500 A | 1/1994 | Mazzola et al. |
| 5,724,178 A | 3/1998 | Grandpierre et al. |
| 5,825,825 A | 10/1998 | Altmann et al. |
| 6,173,018 B1 | 1/2001 | Kuroki |
| 7,145,960 B2 * | 12/2006 | Shigemasa ........... G06K 7/0008 375/295 |
| 7,996,705 B2 | 8/2011 | Takeuchi |
| 8,750,406 B2 | 6/2014 | Pan et al. |
| 2011/0267956 A1 * | 11/2011 | Yonge, III ............ H04L 12/413 370/241 |
| 2016/0309349 A1 * | 10/2016 | Li .......................... H04L 27/18 |

* cited by examiner

*Primary Examiner* — Dac V Ha
(74) *Attorney, Agent, or Firm* — Hayes Soloway P.C.

(57) ABSTRACT

The present disclosure relates to system(s) and method(s) for multi-level amplitude modulation and demodulation. The system accepts a frame delimiter signal, when a comparator is triggered upon receiving the frame delimiter signal from a transmitter. Further, the system receives modulated data associated with a data frame from the transmitter. In one aspect, the modulated data may be generated by modulation of the data frame using a set of three amplitude levels. Upon receiving the modulated data, the system demodulates the modulated data to retrieve the data frame along with the frame delimiter signal, which can be used for successive digital logic elements for enhanced performance.

10 Claims, 4 Drawing Sheets

SYSTEM AND METHOD FOR MULTI-LEVEL AMPLITUDE MODULATION AND DEMODULATION

CROSS-REFERENCE TO RELATED APPLICATIONS AND PRIORITY

The present application claims benefit from Indian Complete Patent Application No. 201811045445 filed on 1 Dec. 2018 the entirety of which is hereby incorporated by reference.

TECHNICAL FIELD

The present disclosure in general relates to the field of a wireless data communication. More particularly, the present invention relates to a system and method for multi-level amplitude modulation and demodulation.

BACKGROUND

Currently, during wireless data transfer, a logic is used at a transmitter to denote that the transmitter is sending data to a receiver. Further, after completion of sending the data, a logic is used, at the transmitter, to inform the receiver that the data transmission is completed. Also, some techniques implement logic of a start of frame to indicate start of data, and an end of frame to indicate an end of data. However, it requires large bandwidth and power to implement the logic of the start of frame and the end of frame.

Further, in conventional amplitude modulation system, data is modulated by varying an amplitude of carrier wave in proportion with message signal. The carrier wave comprises two amplitude levels i.e. high level and low level. Further, the data may be transmitted to a receiver. The receiver may demodulate the data. During demodulation, a message signal may be retrieved at the receiver. However, loss of data may occur during the demodulation of the data.

SUMMARY

Before the present systems and methods for multi-level amplitude modulation and demodulation, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for multi-level amplitude modulation and demodulation. This summary is not intended to identify essential features of the claimed subject matter nor is it intended for use in determining or limiting the scope of the claimed subject matter.

In one implementation, a system for multi-level amplitude modulation or demodulation of a data frame is illustrated. The system comprises a memory and a processor coupled to the memory, further the processor is configured to execute programmed instructions stored in the memory. In one embodiment, the processor may execute programmed instructions stored in the memory for accepting a frame delimiter signal, associated with a frame delimiter amplitude level, from a transmitter. The frame delimiter signal may be received, when a comparator is triggered upon receiving the frame delimiter signal. Once the frame delimiter signal is accepted, the processor may execute programmed instructions stored in the memory for receiving modulated data, associated with the data frame, from the transmitter. In one embodiment, the transmitter may generate the modulated data based on modulation of the data frame using a set of three amplitude levels. The set of three amplitude levels may comprise a high amplitude level, a low amplitude level and the frame delimiter amplitude level. Upon receiving the modulated data, the processor may execute programmed instructions stored in the memory for demodulating the modulated data to retrieve the data frame.

In another implementation, a method for multi-level amplitude modulation and demodulation of a data frame is illustrated. In one embodiment, the method may comprise accepting a frame delimiter signal, associated with a frame delimiter amplitude level, from a transmitter. The frame delimiter signal may be received, when a comparator is triggered upon receiving the frame delimiter signal. Once the frame delimiter signal is accepted, the method may comprise receiving modulated data, associated with the data frame, from the transmitter. In one embodiment, the transmitter may generate the modulated data based on modulation of the data frame using a set of three amplitude levels. The set of three amplitude levels may comprise a high amplitude level, a low amplitude level and the frame delimiter amplitude level. Upon receiving the modulated data, the method may comprise demodulating the modulated data to retrieve the data frame.

In yet another implementation, a computer program product having embodied computer program for multi-level amplitude modulation and demodulation of a data frame is disclosed. In one embodiment, the program may comprise a program code for accepting a frame delimiter signal, associated with a frame delimiter amplitude level, from a transmitter. The frame delimiter signal may be received, when a comparator is triggered upon receiving the frame delimiter signal. Once the frame delimiter signal is accepted, the program may comprise a program code for receiving modulated data, associated with the data frame, from the transmitter. In one embodiment, the transmitter may generate the modulated data based on modulation of the data frame using a set of three amplitude levels. The set of three amplitude levels may comprise a high amplitude level, a low amplitude level and the frame delimiter amplitude level. Upon receiving the modulated data, the program may comprise a program code for demodulating the modulated data to retrieve the data frame.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "receiving", "accepting", "generating", "modulating", "demodulating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for multi-level amplitude modulation and demodulation of a data frame are now described. The disclosed embodiments of the system and method for the multi-level amplitude modulation and demodulation of the data frame are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for multi-level amplitude modulation and demodulation of a data frame is not intended to be limited to the embodiments illustrated, but is to be accorded the widest scope consistent with the principles and features described herein.

The present subject matter relates to multi-level amplitude modulation and demodulation of a data frame. In one embodiment, modulated data may be generated based on modulation of a data frame at a transmitter. The data frame may be modulated at a high amplitude level, a low amplitude level and a frame delimiter amplitude level. If a comparator, at a receiver, is triggered upon receiving a frame delimiter signal, then the frame delimiter signal, associated with a frame delimiter amplitude level, may be accepted. Upon acceptance of the frame delimiter signal, the modulated data may be received by the receiver. Further, the modulated data may be demodulated to retrieve a clock signal, a data pulse and the frame delimiter signal.

Figure 1:
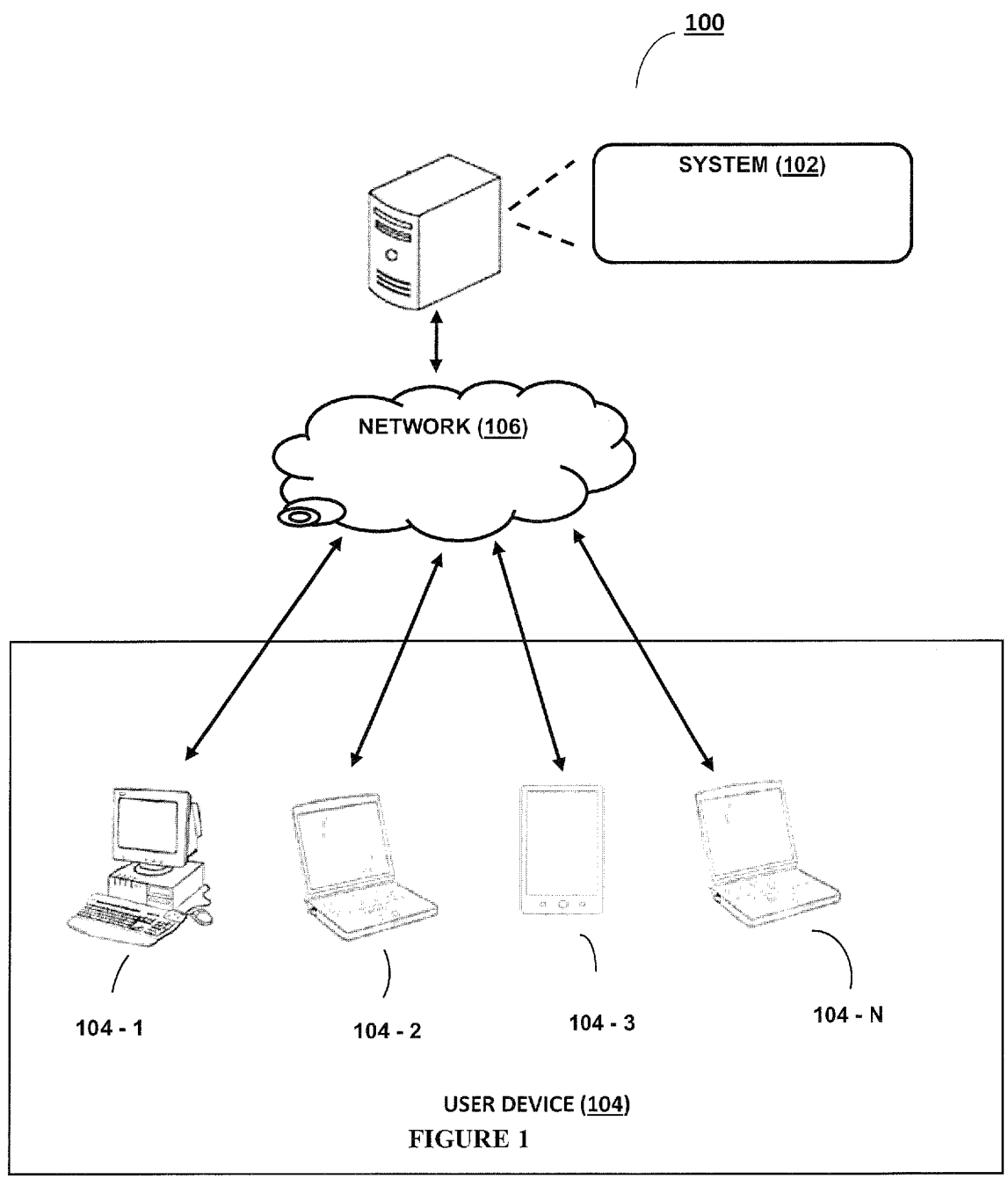
FIG. 1 illustrates a network implementation of a system for multi-level amplitude modulation and demodulation of a data frame, in accordance with an embodiment of the present subject matter.

Referring now to FIG. 1, a network implementation 100 of a system 102 for multi-level amplitude modulation and demodulation of a data frame is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, a transmitter may generate modulated data based on modulation of a data frame. The data frame may be modulated using a set of three amplitude levels. The set of three amplitude levels may comprise a high amplitude level, a low amplitude level and a frame delimiter amplitude level.

In one embodiment, the system 102 may accept a frame delimiter signal associated with the frame delimiter amplitude level. The system 102 may accept the frame delimiter signal, when a comparator is triggered upon receiving the fame delimiter signal from a transmitter. Upon accepting the frame delimiter signal, the system 102 may receive modulated data from the transmitter. Once the modulated data is received, the system 102 may demodulate the modulated data to retrieve the data frame.

Figure 2:
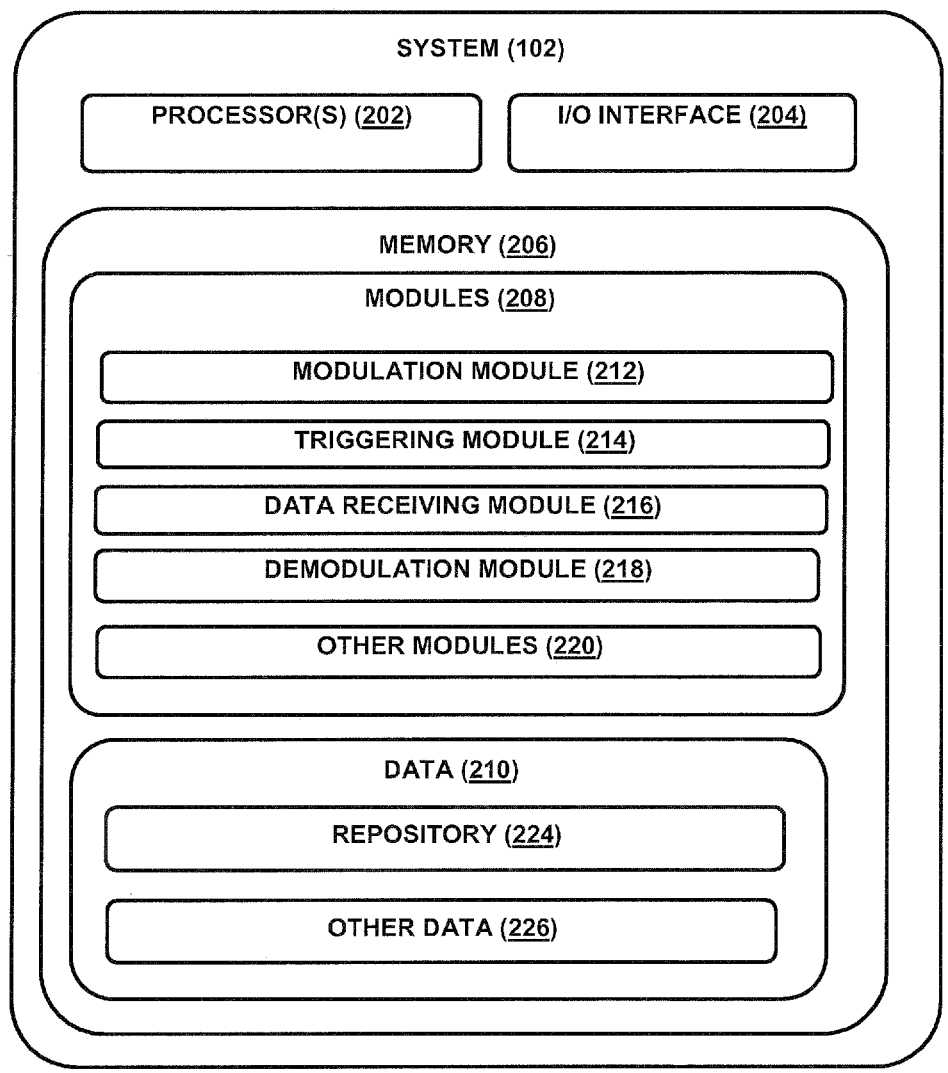
FIG. 2 illustrates the system for the multi-level amplitude modulation and demodulation of the data frame, in accordance with an embodiment of the present subject matter.

Referring now to FIG. 2, the system 102 for multi-level amplitude modulation and demodulation of a data frame is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a modulation module 212, a triggering module 214, data receiving module 216, a demodulation module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 224, and other data 226. In one embodiment, the other data 226 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the modulation module 212 may modulate a data frame. The data frame may be modulated at a transmitter. The data frame may comprise data, a start of frame and an end of frame. The data frame may be modulated using a set of three amplitude levels. The set of three amplitude levels may comprise a high amplitude level, a low amplitude level and a frame delimiter amplitude level. In one embodiment, the modulation of the data frame may correspond to variation of an amplitude of a carrier wave in proportion to the high level amplitude, the low level amplitude, and the frame delimiter amplitude level.

In one aspect, the high amplitude level may correspond to logic 1, and the low amplitude level may correspond to logic 0. The frame delimiter amplitude level may be greater than the high amplitude level. In one example, the frame delimiter amplitude level may be referred as a handshaking amplitude level.

In one embodiment, a modulation circuit, at the transmitter, may be designed using an OPAMP configuration. The OPAMP may be controlled by a microcontroller. In one example, the microcontroller may be an 8-bit microcontroller. The microcontroller may be programmed for a logic of modulation of the data frame at the high amplitude level, the low amplitude level and the frame delimiter amplitude level.

Based on the modulation of the data frame, the modulation module 212 may generate modulated data associated with the data frame. During modulation, the data, associated with the data frame, may be modulated at the high amplitude level and the low amplitude level. Further, at least one of the start of frame or the end of frame may be modulated at the frame delimiter amplitude level. Based on the modulation of data, and the start of frame or the end of frame, the modulated data may be generated. In one embodiment, the modulated data may comprise a data signal, associated with the modulation of the data, and a frame delimiter signal, associated with the modulation of the start of frame or the end of frame.

In one embodiment, the triggering module 214 may receive the frame delimiter signal, associated with the frame delimiter amplitude level. The frame delimiter signal may be received at a receiver. The triggering module 214 may check a comparator at the receiver. If the comparator is triggered upon receiving the frame delimiter signal, the triggering module 214 may accept the frame delimiter signal. In other words, the triggering of the comparator upon receiving the frame delimiter signal may indicate that the transmitter is sending valid data to the receiver.

In one embodiment, the frame delimiter signal may act as a handshaking signal. In one aspect, multiple amplitude level, associated with the frame delimiter signal, may be used to establish communication with multiple receivers. The multiple amplitude level may be used by single transmitter to communicate with the multiple receivers.

In one exemplary embodiment, if the comparator is not triggered by the frame delimiter signal, it may indicate that the transmitter is not sending valid data to the receiver. In this case, the receiver may ignore the data sent by the transmitter.

Upon acceptance of the frame delimiter signal, the data receiving module 216 may receive the modulated data, associated with the data frame. In one aspect, the data receiving module 216 may receive the frame delimiter signal before the data signal, associated with the modulated data. In other words, the data receiving module 216 may receive the modulated data based on handshaking between the transmitter and the receiver using the frame delimiter signal.

Once the modulated data is received, the demodulation module 218 may demodulate the modulated data. In one aspect, the demodulation of the modulated data may be an extraction of information from the modulated data to retrieve the data frame. Based on the demodulation, a clock signal, a data pulse, and the frame delimiter signal may be retrieved at the receiver. Further, the clock signal and the frame delimiter signal may be used to validate the data pulse. In one aspect, the frame delimiter signal may be used for successive digital logic elements to enhance the performance. In one example, the data pulse may be valid, when, during the clock signal, the frame delimiter signal is logic 1. In another example, the data pulse may be valid, when, during the clock signal, the frame delimiter signal is logic 0.

During demodulation, the modulated data may be passed to an envelope detector. The envelop detector may further determine a DC value of the modulated data. In one embodiment, the DC value of the data signal, and the DC value of the frame delimiter signal may be determined. Once the DC value is determined, the modulated data may be provided to the comparator. Further, the comparator may determine carrier frequency, in real-time. Based on determination of the carrier frequency, the clock signal, the data pulse and the frame delimiter signal may be retrieved at the receiver.

Exemplary embodiments discussed above may provide certain advantages. Though not required to practice aspects of the disclosure, these advantages may include those provided by the following features.

Some embodiments of the system and the method are configured to enhance data rate.

Some embodiments of the system and the method are configured to reduce error during wireless data transfer.

Some embodiments of the system and method are useful for Near Field communication, and transcutaneous communication for medical implant.

Figure 3:
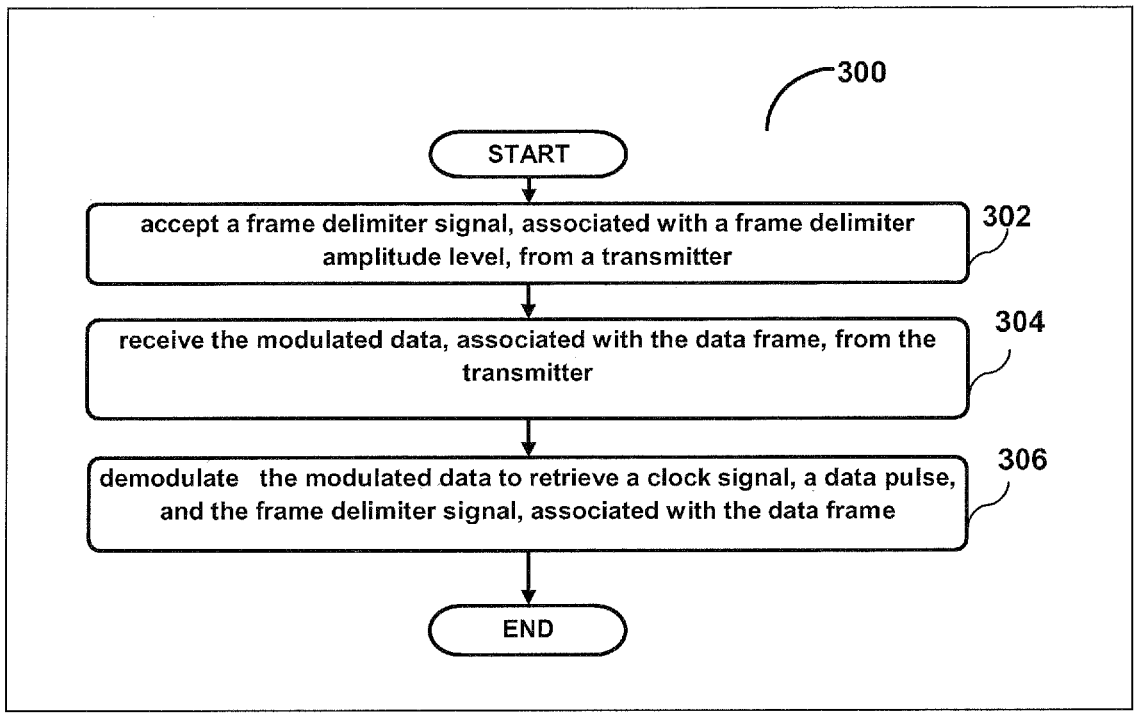
FIG. 3 illustrates a method for multi-level amplitude modulation and demodulation of a data frame, in accordance with an embodiment of the present subject matter.

Referring now to FIG. 3, a method 300 for multi-level amplitude modulation and demodulation of a data frame, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, a frame delimiter signal may be accepted. In one implementation, the triggering module 214 may accept the frame delimiter signal associated with a frame delimiter amplitude level. The frame delimiter signal may be accepted, when a comparator is triggered upon receiving the frame delimiter signal from a transmitter.

At block 304, modulated data associated with a data frame may be received. In one implementation, the data receiving module 216 may receive the modulated data. In one aspect, the modulated data may be generated based on modulation of the data frame at the transmitter. The data frame may be modulated using a set of three amplitude levels. The set of amplitude levels may comprise a high amplitude level, a low amplitude level and the frame delimiter amplitude level.

At block 306, the modulated data may be demodulated. In one implementation, the demodulation module 218 may demodulate the modulated data. Based on demodulation of the modulated data, a clock signal, a data pulse and the frame delimiter signal may be retrieved at the receiver.

Figure 4:
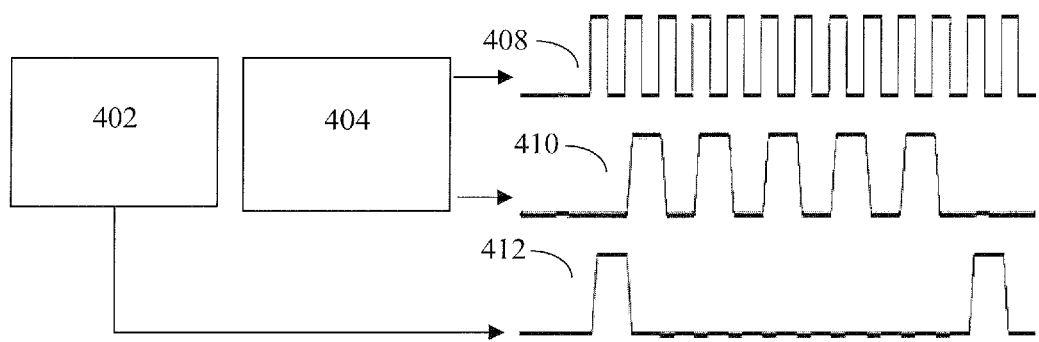
FIG. 4 illustrates the demodulation of the data frame at receiver, in accordance with an embodiment of the present subject matter.

Referring now to FIG. 4, illustrates the demodulation of the data frame the receiver, is disclosed in accordance with an embodiment of the present subject matter. In one embodiment, the receiver comprises a comparator 402 and a demodulator 404. The comparator 402 may be 2 volts comparator or 5 volts comparator. Once the modulated data is received from the transmitter, the comparator 402 and the demodulator 404 are configured to demodulate the modulated data. Based on the demodulation of the modulated data, a clock signal 408, a data pulse 410, and a frame delimiter signal 412 may be retrieved at the receiver. The clock signal 408 and the frame delimiter signal 412 may be used to validate the data pulse 410. In one example, the data pulse 410 may be valid, when, during the clock signal 408, the frame delimiter signal 412 is logic 1. In another example, the data pulse 410 may be valid, when, during the clock signal 408, the frame delimiter signal 412 is logic 0.

Although implementations for systems and methods for multi-level amplitude modulation and demodulation of a data frame have been described, it is to be understood that the appended claims are not necessarily limited to the specific features or methods described. Rather, the specific features and methods are disclosed as examples of implementations for multi-level amplitude modulation and demodulation of the data frame.

The invention claimed is:

1. A system for multi-level amplitude modulation and demodulation of a data frame, the system comprises:
    a memory;
    a processor coupled to the memory, wherein the processor is configured to execute programmed instructions stored in the memory to:
        accept a frame delimiter signal, associated with a frame delimiter amplitude level, from a transmitter, when a comparator is triggered upon receiving the frame delimiter signal, wherein the transmitter is configured to
            generate modulated data based on modulation of a data frame using a set of three amplitude levels, wherein the set of three amplitude levels comprise a logic 1, a logic 0 and the frame delimiter amplitude level;
        receive the modulated data, associated with the data frame, from the transmitter; and
        demodulate the modulated data to retrieve a clock signal, a data pulse, and the frame delimiter signal, associated with the data frame.

2. The system as claimed in claim 1, wherein the frame delimiter signal corresponds to one of a start of frame or an end of frame.

3. The system as claimed in claim 1, wherein an amplitude associated with the frame delimiter amplitude level is greater than an amplitude associated with the logic 1.

4. The system as claimed in claim 1, wherein the data frame corresponds to data, the start of frame and the end of frame.

5. The system as claimed in claim 1, wherein the clock signal and the frame delimiter signal are used to validate the data pulse.

6. A method for multi-level amplitude modulation and demodulation of a data frame, the method comprises steps of:
    accepting, by a processor, a frame delimiter signal, associated with a frame delimiter amplitude level, from a transmitter, when a comparator is triggered upon receiving the frame delimiter signal, wherein the transmitter is configured to
        generate modulated data based on modulation of a data frame using a set of three amplitude levels, wherein the set of three amplitude levels comprise a logic 1, a logic 0 and the frame delimiter amplitude level;
    receiving, by the processor, the modulated data, associated with the data frame, from the transmitter; and
    demodulating, by the processor, the modulated data to retrieve a clock signal, a data pulse, and the frame delimiter signal, associated with the data frame.

7. The method as claimed in claim 6, wherein the frame delimiter signal corresponds to one of a start of frame or an end of frame.

8. The method as claimed in claim 6, wherein an amplitude associated with the frame delimiter amplitude level is greater than an amplitude associated with the logic 1.

9. The method as claimed in claim 6, wherein the data frame corresponds to data, the start of frame and the end of frame.

10. The method as claimed in claim 6, wherein the clock signal and the frame delimiter signal are used to validate the data pulse.

* * * * *